United States Patent
Lu

(10) Patent No.: US 6,622,344 B1
(45) Date of Patent: Sep. 23, 2003

(54) PIVOT HINGE

(76) Inventor: Sheng-Nan Lu, No. 174, Chunying St., Shulin Chen, Taipei Hsien (TW)

( * ) Notice: Subject to any disclaimer, the term of this patent is extended or adjusted under 35 U.S.C. 154(b) by 0 days.

(21) Appl. No.: 10/164,991

(22) Filed: Jun. 6, 2002

(51) Int. Cl.$^7$ ............................................. E05D 11/08
(52) U.S. Cl. ........................... 16/342; 16/340; 16/337; 16/386; 16/387
(58) Field of Search ......................... 16/342, 337, 273, 16/274, 386; 248/900, 917, 923; 361/680–683; 403/297, 300, 86, 91, 103, 104, 109, 290, 146, 119–121

(56) References Cited

U.S. PATENT DOCUMENTS

| | | | | |
|---|---|---|---|---|
| 12,139 A | * | 1/1855 | Sloan | 16/342 |
| 5,503,491 A | * | 4/1996 | Lu | 403/86 |
| 5,713,672 A | * | 2/1998 | Lu | 384/289 |
| 5,749,124 A | * | 5/1998 | Lu | 16/307 |
| 5,752,293 A | * | 5/1998 | Lowry et al. | 16/342 |
| 5,774,939 A | * | 7/1998 | Lu | 16/342 |
| 5,894,635 A | * | 4/1999 | Lu | 16/342 |
| 5,943,738 A | * | 8/1999 | Karfiol | 16/342 |
| 6,263,543 B1 | * | 7/2001 | Daoud | 16/342 |
| 6,317,927 B1 | * | 11/2001 | Lai et al. | 16/342 |
| 6,507,977 B2 | * | 1/2003 | Lu | 16/342 |

FOREIGN PATENT DOCUMENTS

EP    0577570 A1  *  1/1994

* cited by examiner

Primary Examiner—Chuck Y. Mah
(74) Attorney, Agent, or Firm—Thomas, Kayden, Horstemeyer & Risley LLP

(57) ABSTRACT

A pivot hinge has a first stem, a second stem and a sleeve. The first and second stems respectively have a body with through holes adapted to be engaged with a surface, and an extension with grooves formed on a periphery of the extension. The sleeve is hollow to respectively receive therein the extensions of the first and second stems and has a cutout longitudinally defined in an outer periphery of the sleeve and a pair of gaps radially defined in the periphery of the sleeve to communicate with the cutout.

2 Claims, 6 Drawing Sheets

PIVOT HINGE

BACKGROUND OF THE INVENTION

1. Field of the Invention

The present invention relates to a pivot hinge, and more particularly to a pivot hinge with two stems and a sleeve. Each stem has an extension to be received in the sleeve so that the friction required by pivotal movement is evenly distributed to two extensions and thus the life span of the pivot span is prolonged.

2. Description of Related Art

With reference to FIG. 6, a conventional pivot hinge is composed of a male part (50) and a female part (60). The male part (50) has a first stem (51) and an extension (52) integrally formed with the first stem (5 1). The female part (60) has a hollow cylindrical portion (61) formed to correspond to the extension (52) and a second stem (62) integrally formed with the hollow cylindrical portion (61).

When the pivot hinge of this kind is to be assembled, the extension (52) is interference fitted in the hollow cylindrical portion (61). Thereafter, with the first stem (51) and the second stem (62), the pivot hinge is adapted to securely connect to surfaces of two elements of a device respectively, such as the screen and the main frame of a laptop. When the conventional pivot hinge is in operation, the force required to maintain the screen at any desired angle is from the friction between the extension (52) and an. interior face of the hollow cylindrical portion (61). Because all the pivotal movement involves friction, after a period of time using the pivot hinge, either the extension (52) or the interior face of the cylindrical portion (61) is worn and the pivot hinge can no longer provide the required force to maintain the tilt of the screen.

To overcome the shortcomings, the present invention tends to provide an improved pivot hinge to mitigate and obviate the aforementioned problems.

SUMMARY OF THE INVENTION

The primary objective of the present invention is to provide an improved pivot hinge having two stems each provided with an extension and a sleeve provided to receive therein the two extensions so as to evenly distribute the friction to two extensions and prolong the life span of the hinge.

In order to accomplish the foregoing objective, the pivot hinge has a first stem, a second stem and a sleeve. The first stem has a body with first through holes adapted to be engaged with a surface, such as a laptop screen surface, and an extension with first grooves formed on a periphery of the extension.

The second stem has a body with second through holes adapted to be engaged with a surface, such as a laptop main frame surface, and an extension with second grooves formed on a periphery of the extension.

The sleeve is hollow and has a cutout longitudinally defined in an outer periphery of the sleeve and a pair of gaps radially defined in the periphery of the sleeve to communicate with the cutout. The sleeve further has inner grooves defined in an inner surface of the sleeve to correspond to the grooves of the first and second stems respectively.

Other objects, advantages and novel features of the invention will become more apparent from the following detailed description when taken in conjunction with the accompanying drawings.

DETAILED DESCRIPTION OF THE PREFERRED EMBODIMENT

Figure 1:
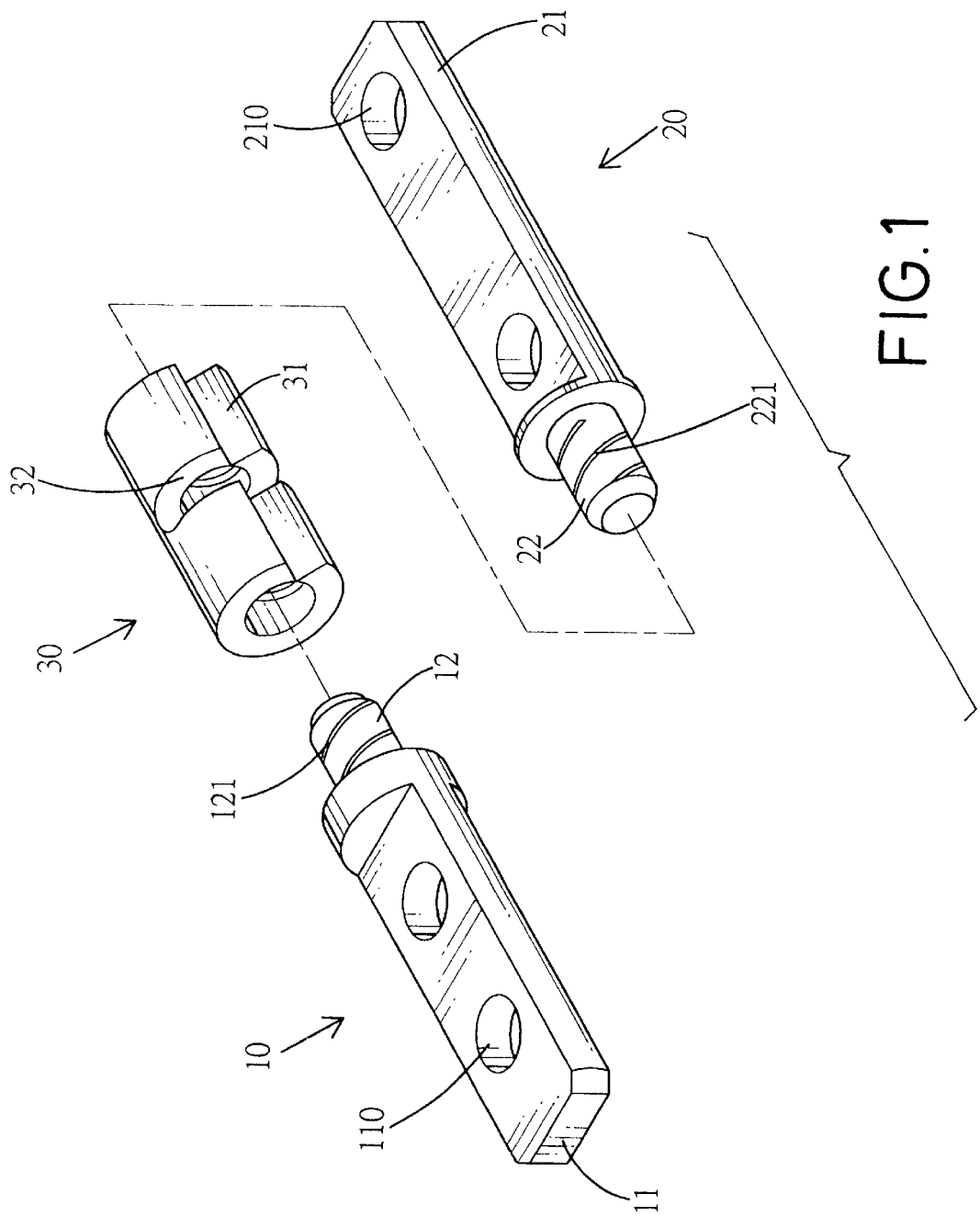
FIG. 1 is an exploded perspective view of the pivot hinge of the present invention.

With reference to FIG. 1, the pivot hinge in accordance with the present invention is composed of a first stem (10), a second stem (20) and a sleeve (30).

The first stem (10) has a first body (11) with first through holes (110) adapted to be engaged with a surface, such as a laptop screen surface, and a first extension (12) with first grooves (121) formed on a periphery of the first extension (12).

The second stem (20) has a second body (21) with second through holes (210) adapted to be engaged with a surface, such as a laptop main frame surface, and a second extension (22) with second grooves (221) formed on a periphery of the second extension (22).

Figure 2:
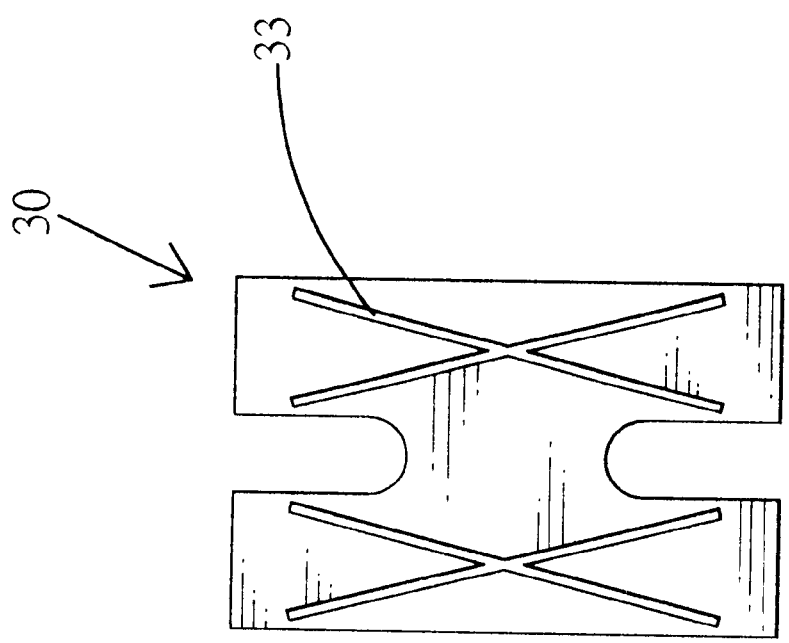
FIG. 2 is a plan view of the sleeve in extended state.

The sleeve (30) is hollow and has a cutout (31) longitudinally defined in an outer periphery of the sleeve (30) and a pair of gaps (32) radially defined in the periphery of the sleeve (30) to communicate with the cutout (31). The sleeve (30) further has inner grooves (33), as shown in FIG. 2, defined in an inner surface of the sleeve (30) to correspond, to the grooves (121,221) of the first and second stems (10,20) respectively.

Figure 3:
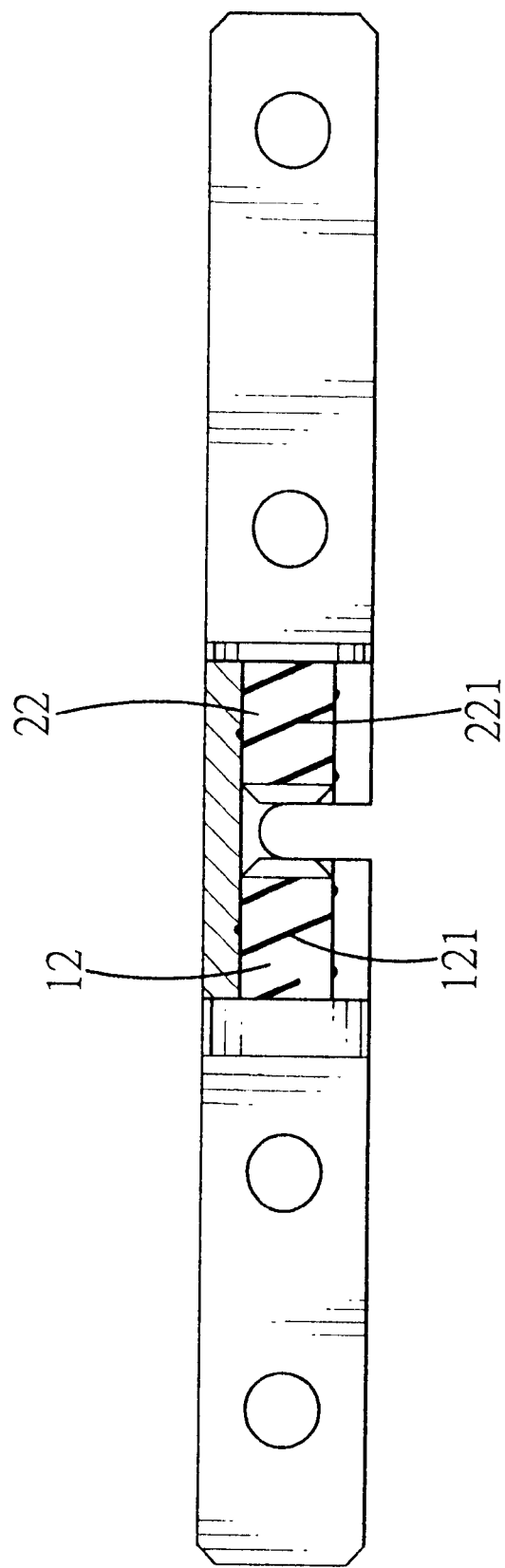
FIG. 3 is a side plan view in partial section showing the assembly of the pivot hinge.

With reference to FIG. 3, when the pivot hinge of the present invention is assembled, the two extensions (12,22) are received in the sleeve (30) from opposite ends of the sleeve (30). After the two extensions (12,22) are received in the sleeve (30), the grooves (121,221) of the two extensions (12,22) are respectively communicating with the inner grooves (33) of the sleeve (30).

Figure 4:
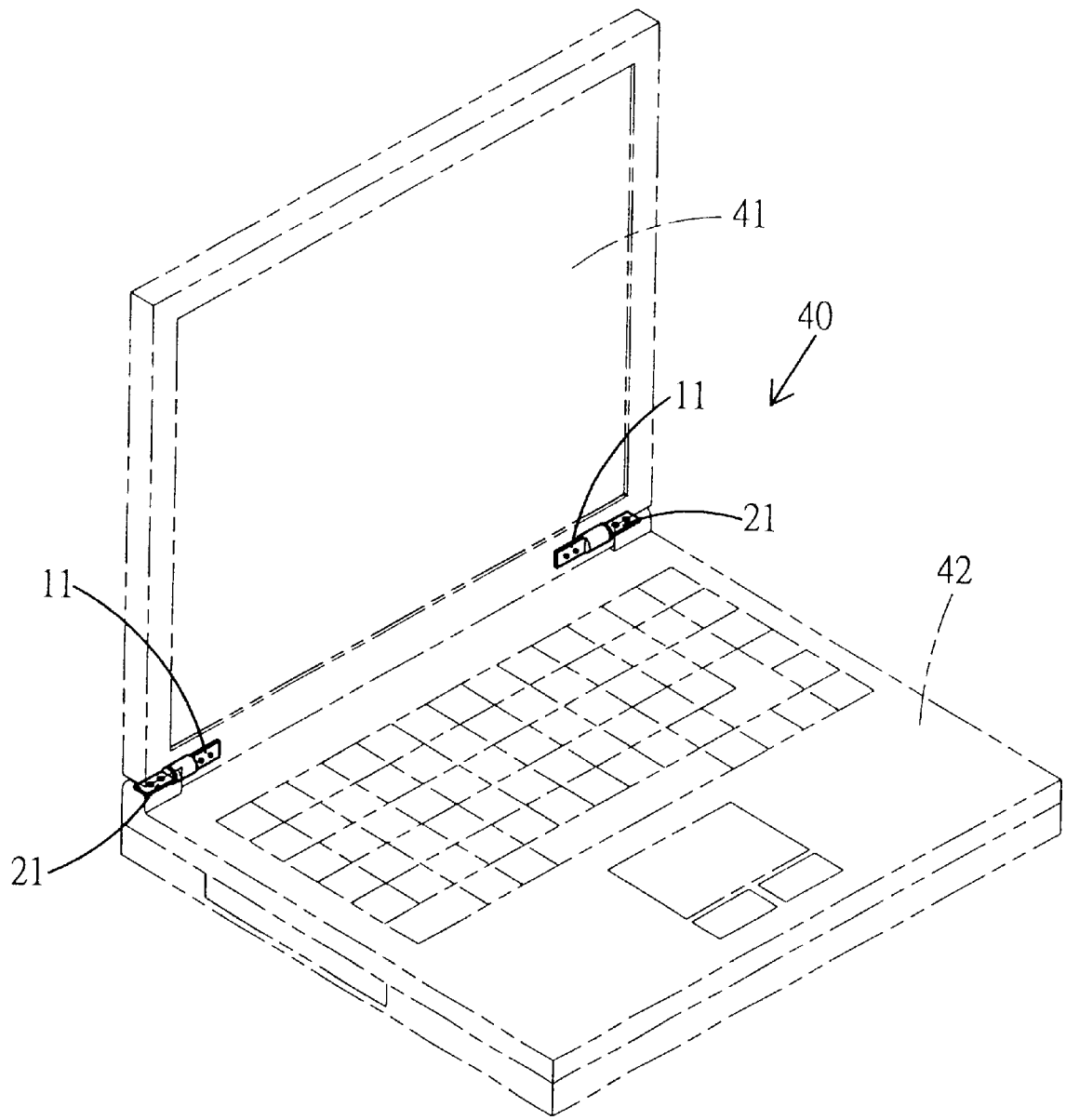
FIG. 4 is a perspective view showing the application of the pivot hinge of the present invention.

It is noted from FIG. 4 that because the pivot hinge of the present invention is composed of two different stems (10,20) which are respectively connected to the screen (41) and the main frame (42) of a laptop (40) via the bodies (11,21) the friction required to maintain the screen (41) at any angle relative to the main frame (42) is able to be evenly distributed to two extensions (12,22) instead of one extension as in the conventional pivot hinge. Due to the distribution of friction to the two extensions (12,22), the life span of the pivot hinge of the present invention is prolonged.

Figure 5:
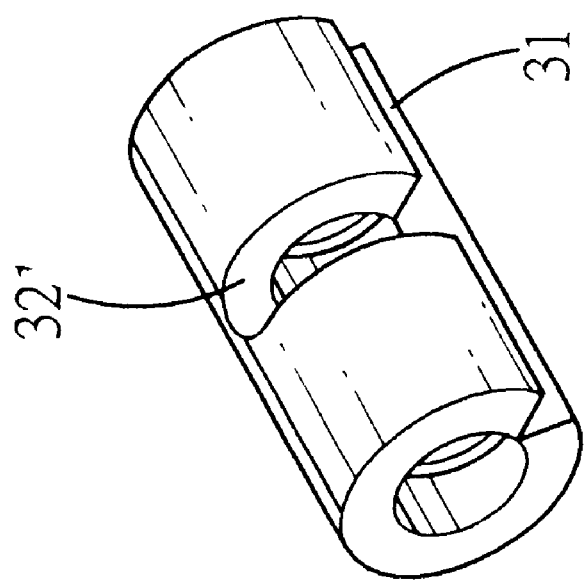
FIG. 5 is a perspective view of another embodiment of the sleeve of the present invention.
Figure 6:
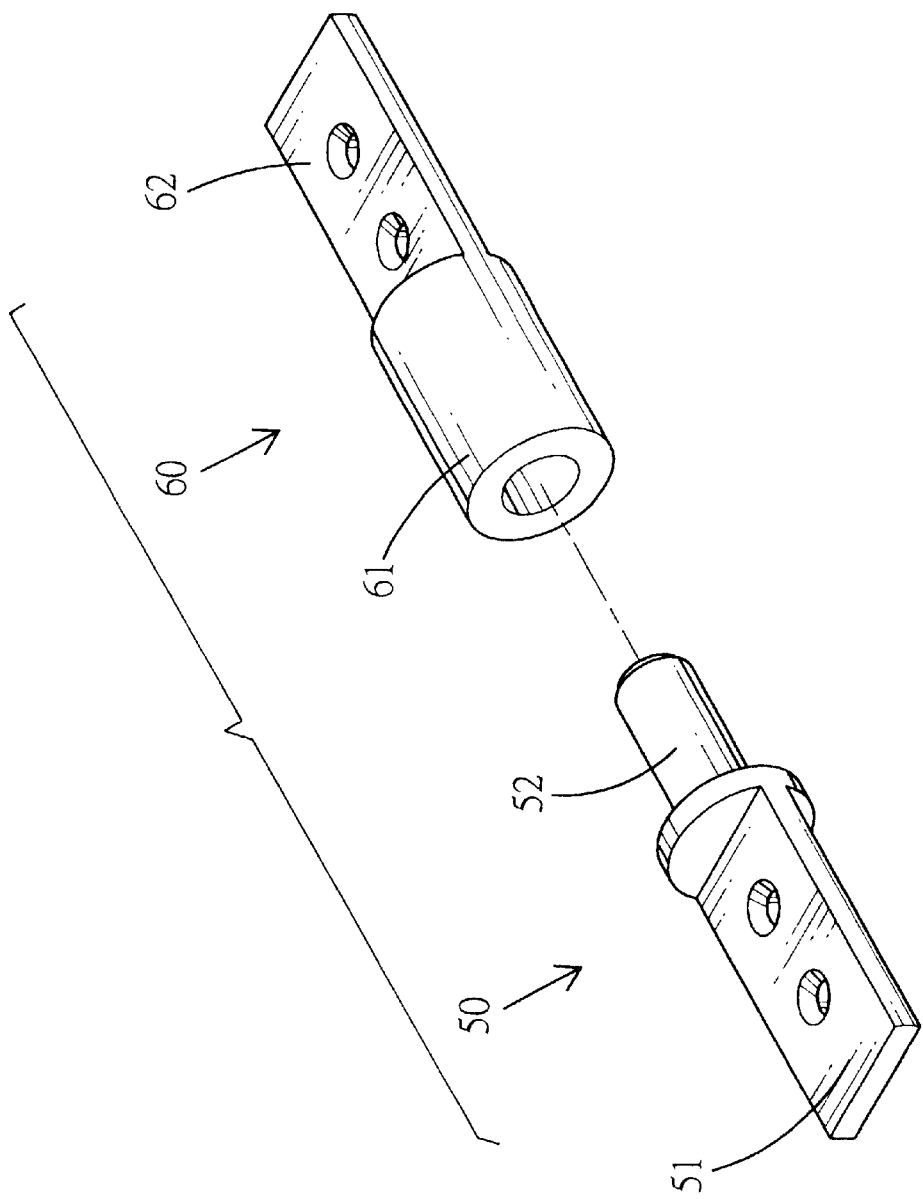
FIG. 6 is an exploded perspective view of a conventional pivot hinge.

With reference to FIG. 5 and taking FIG. 1 for reference, it is noted that the gap (32) in FIG. 1 extends over the cutout (31. However, the gap (32') in FIG. 5 communicates with the cutout (31) and does not extend over the cutout (31) yet still fulfill the requirement.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pivot hinge comprising a first stem, a second stem and a sleeve, wherein the first stem has a first body with first through holes adapted to be engaged with a surface and a first extension with first grooves formed on a periphery of the first extension;

the second stem has a second body with second through holes adapted to be engaged with a surface and a second extension with second grooves formed on a periphery of the second extension;

the sleeve is hollow to receive therein the first and second extensions of the first and second stems and has a cutout longitudinally defined in an outer periphery of the sleeve and at least a gap radially defined through the outer periphery of the sleeve to communicate with the cutout and inner grooves defined in an inner surface of the sleeve to correspond to the first and second grooves of the first and second stems respectively.

2. The pivot hinge as claimed in claim 1, wherein two gaps are radially defined through the outer periphery of the sleeve to communicate with the cutout.

* * * * *